United States Patent
Austin et al.

(10) Patent No.: US 7,252,770 B2
(45) Date of Patent: Aug. 7, 2007

(54) MULTIFUNCTIONAL CALCIUM CARBONATE AND CALCIUM PHOSPHATE SCALE INHIBITOR

(75) Inventors: Anne-Marie B. Austin, Signal Mountain, TN (US); Eric C. Ward, Signal Mountain, TN (US)

(73) Assignee: National Starch and Chemical Investment Holding Corporation, New Castle, DE (US)

(*) Notice: Subject to any disclaimer, the term of this patent is extended or adjusted under 35 U.S.C. 154(b) by 138 days.

(21) Appl. No.: 11/381,258

(22) Filed: May 2, 2006

(65) Prior Publication Data

US 2006/0191852 A1   Aug. 31, 2006

Related U.S. Application Data

(62) Division of application No. 10/100,761, filed on Mar. 18, 2002, now Pat. No. 7,087,189.

(51) Int. Cl.
   C02F 5/12 (2006.01)
(52) U.S. Cl. .................. 210/699; 134/22.19; 210/701
(58) Field of Classification Search .............. 210/701
   See application file for complete search history.

(56) References Cited

U.S. PATENT DOCUMENTS

| | | |
|---|---|---|
| 4,711,725 A | 12/1987 | Amick et al. |
| 4,784,774 A | 11/1988 | Amjad et al. |
| 4,936,987 A * | 6/1990 | Persinski et al. ........... 210/699 |
| 5,277,823 A | 1/1994 | Hann et al. |
| 5,547,612 A | 8/1996 | Austin et al. |
| 5,601,723 A | 2/1997 | Kirk et al. |
| 5,709,814 A | 1/1998 | Gill |
| 5,755,972 A | 5/1998 | Hann et al. |
| 6,114,294 A | 9/2000 | Gauthier et al. |
| 6,207,780 B1 | 3/2001 | Stockhausen et al. |
| 6,395,185 B1 | 5/2002 | Gauthier et al. |
| 6,645,384 B1 | 11/2003 | Richardson et al. |

FOREIGN PATENT DOCUMENTS

| | | |
|---|---|---|
| CN | 1134401 | 10/1996 |
| EP | 0727446 A1 | 8/1996 |
| EP | 1088794 A1 | 4/2001 |

* cited by examiner

*Primary Examiner*—Peter A. Hruskoci
(74) *Attorney, Agent, or Firm*—David LeCroy (57) ABSTRACT

The present invention is directed a multifunctional polymer capable of inhibiting both calcium carbonate and calcium phosphate scale. The multifunctional polymer contains at least one monomer unit from each of four groups: dicarboxylic acids, mono-carboxylic acids, nonionic monomers, and sulfonated or sulfated monomers. The polymer also inhibits many other alkaline earth scales, such as calcium sulfate scale and provides stabilization of minerals such as iron, zinc and manganese. The polymer is especially effective in highly stressed systems that contain high electrolyte concentrations and have a high number of cycles of concentration.

6 Claims, 5 Drawing Sheets

Figure 1: Multifunctional Efficiency Test

FIGURE 2: SCHEMATIC OF DYNAMIC TEST

Figure 3: LSI Values Per Cycle of Concentration

Figure 4: Calcium Threshold Inhibition
T = 132F  pH = 8.80

Figure 5: Calcium Threshold Inhibition
T = 104F  pH = 8.80

Figure 6: Soluble Iron Concentrations
T = 104F  pH = 8.80

Figure 7: Achieved Ortho-Phosphate Concentrations with a 3.0 mg/L Feed

FIGURE 8 RESULTS OF DYNAMIC TEST ON RODS

Figure 9: Weight of Scale Components on #1 Heat Exchange Rods

MULTIFUNCTIONAL CALCIUM CARBONATE AND CALCIUM PHOSPHATE SCALE INHIBITOR

CROSS REFERENCE TO RELATED APPLICATIONS

The present application is a divisional application of U.S. Application Ser. No. 10/100,761, filed 18 Mar. 2002, now U.S. Pat. No. 7,087,189.

BACKGROUND OF THE INVENTION

1. Technical Field

This invention relates to a polymer capable of inhibiting both calcium carbonate and calcium phosphate scale. The polymer also inhibits calcium sulfate scale and provides iron stabilization. The polymer is especially effective in highly stressed systems that contain high electrolyte concentrations and have a high number of cycles of concentration.

2. Background Information

One problem in industrial water treatment is the prevention of calcium scales caused by the precipitation of calcium salts, such as calcium carbonate, calcium sulfate and calcium phosphate. These salts are inversely soluble, meaning that their solubility decreases as the temperature increases. For industrial applications, where higher temperatures and higher concentrations of salts are present, this usually translates to precipitation occurring at the heat transfer surfaces. The precipitating salts can then deposit onto the surface, resulting in a layer of calcium scale. The calcium scale can lead to the loss of heat transfer in the system and cause overheating of production processes. In addition, scaling can promote localized corrosion. Calcium phosphate, unlike calcium carbonate, is not generally a naturally occurring problem. However, ortho-phosphates are commonly added to industrial systems (and sometimes to municipal water systems) as a corrosion inhibitor for ferrous metals, usually at levels between 2.0-20.0 mg/L. Therefore, the precipitation of calcium phosphate not only can result in the scaling problems previously discussed, but can also result in severe corrosion problems, as the ortho-phosphate is removed from solution. As a result, industrial cooling systems require periodic maintenance in which the system must be shut down, cleaned and the water replaced. Lengthening the time between shutdowns saves costs, and is desirable.

One way to lengthen the time between maintenance is through the use of polymers that can function by either inhibiting the formation of the calcium salts, or by modifying the crystal growth so that the salt disperses when it precipitates rather than depositing on heat transfer surfaces. Dispersion of the precipitated salt crystals is believed to be the result of the adsorption of the inhibitor onto precipitated crystals. The adsorption of the inhibitor can also be used to stabilize the system by facilitating the dispersion and subsequent removal of other suspended particulates, such as mud, silt and clay, and metals such as iron and zinc and their insoluble salts, from aqueous systems. The inhibitor may also interfere with and distort the crystal structure of the scale making the scale less adherent to surfaces or other forming crystals or existing particulates.

Currently different polymers are used to control different types of scale. Maleate-based polymers, along with phosphonates are used to control calcium carbonate scale. Sulfonate-based polymers, such as those disclosed in U.S. Pat. No. 4,711,725, are used to control calcium phosphate, iron, and other particulates. U.S. Pat. No. 5,277,823 describes a method for controlling silica scale formation using a terpolymer of (meth) acrylic acid or maleic acid, a (meth) acrylamido methyl propane sulfonic acid or styrene sulfonic acid, (meth)acrylamide, and another vinyl monomer. The disclosure fails to recognize the importance of both a mono- and a di-carboxylic acid, and does not disclose a polymer for inhibiting both calcium carbonate and calcium phosphate scale.

Multi-functional scale inhibitors have focused on terpolymers polymerized from a strong acid monomer, a weak acid monomer, and a non-ionic monomer. Examples of these polymers include those polymerized from a) (meth)acrylic acid, b) sulfonic acid or acrylamido methyl propane sulfonic acid, and c) acrylamide, sulfonated styrene, phosphino carboxylic acid, or (meth)acrylates. These scale inhibitors tend to have only moderate calcium carbonate inhibition.

The cooling water treatment industry is moving toward a greater degree of water reuse, and higher operating cycles to conserve energy and water. To achieve this goal, increased demands are placed on cooling water treatment programs. These stressed systems contribute to a high tendency to form a variety of scales and deposits in the system. Stressed conditions and their potential negative effects include:

| Stressful condition | Potential Scales/Deposits |
|---|---|
| High pH | $CaCO_3$, $Ca_3(PO_4)_2$, $Fe(OH)_3$ |
| High hardness | $CaCO_3$, $Ca_3(PO_4)_2$ |
| High alkalinity | $CaCO_3$, $ZnCO_3$ |
| High phosphate | $Ca_3(PO_4)_2$ |
| High sulfate | $CaCO_3$, $FeSO_4$ |
| High chloride | $FeCl_3$ |
| High iron | $Fe(OH)_3$ |
| High silica | $SiO_2$, $MgSiO_3$ |
| High suspended solids | Particulate |
| High organics | Microbiological fouling |
| High temperature | $CaCO_3$, $Ca_3(PO_4)_2$, $Fe_2O_3$ |
| High conductivity | $Fe_2O_3$ |
| Oxidizing biocides | $Fe_2O_3$ |
| Low flow | Particulate, $Fe_2O_3$ |

It is an objective of the current invention to provide a single, multifunctional polymer capable of inhibiting both calcium carbonate and calcium phosphate scaling. It is also an objective of the present invention that the single multifunctional scale inhibiting polymer be able to perform at a treatment level equal to or below the combined treatment level of the two or more polymers presently required for the same performance, which would generally not exceed 15.0-20.0 ppm active product. It is a further objective to provide a single, multi-functional polymer that is effective under stressed conditions.

Surprisingly it has been found that a multifunctional polymer containing a dicarboxylic acid, a mono-carboxylic acid, a non-ionic monomer, and a sulfonated or sulfated monomer, in the proper ratios, provides excellent scale and deposit control. This is especially true for systems under stressed conditions. The polymer inhibits calcium carbonate and calcium phosphate scale formation and stabilizes iron and zinc, even at high dissolved and suspended solids levels.

SUMMARY OF THE INVENTION

The present invention is directed to a multifunctional polymer composition formed from a monomer mixture comprising:

a) at least one dicarboxylic acid;

b) at least one monocarboxylic acid;

c) at least one non-ionic monomer; and
d) at least one sulfonated or sulfated monomer.

In a second embodiment, the present invention is directed to a process for inhibiting calcium carbonate and calcium phosphate scale in an aqueous system by adding the multifunctional polymer to the aqueous system. The multifunctional polymer is especially effective at scale prevention in systems that are stressed.

BRIEF DESCRIPTION OF THE DRAWINGS

FIG. 3 is a graph showing LSI values per cycle of concentration.

FIG. 9 is a graph showing the weight of scale components on heat exchange rods.

DETAILED DESCRIPTION OF THE INVENTION

The present invention is directed to a multifunctional polymer for use in inhibiting calcium carbonate and calcium phosphate scales in aqueous systems.

By polymer, as used herein, means a macromolecule formed by free radical polymerization. The multifunctional polymer contains at least one monomer unit from each of four groups: dicarboxylic acids, mono-carboxylic acids, nonionic monomers, and sulfonated or sulfated monomers.

A stressed system, as used herein means a system having a Langelier Saturation Index of at least 2.5. The Langelier Saturation Index or LSI is a common method used to predict the potential for calcium carbonate precipitation in water. This index is based on the difference between the actual pH of the water in question and the saturation pH of calcium carbonate, at the current conditions of the water (actual pH−saturation pH=LSI factor). As a result, an LSI factor of zero indicates that the water is at equilibrium. LSI factors greater than zero indicate that the water is supersaturated and will precipitate calcium carbonate without some form of treatment. The greater the LSI, the greater the driving force for precipitation and scaling. Many factors can contribute to increasing LSI. Increasing pH values has a direct effect on increasing LSI. Increasing calcium and alkalinity concentrations, increasing temperatures, and increasing conductivity all indirectly increase LSI factors by lowering the saturation pH of the water in question. LSI factors of greater than 2.0 are generally considered stressful conditions in the field, with factors from 2.5 to 3.0 considered extremely high stress.

The dicarboxylic monomer is one or more ethylenically unsaturated monomer containing two carboxylic acid groups, and includes aliphatic, branched or cyclic dicarboxylic acids, the alkali or alkaline earth metal or ammonium salts thereof, and the anhydrides thereof. Examples of dicarboxylic acid monomers include, but are not limited to itaconic acid, maleic acid, and maleic anhydride, citraconic acid, mesaconic acid, glutaconic acid, aconitic acid, fumaric acid, and tricarboxy ethylene, or mixtures thereof. Preferred dicarboxylic acid monomers are maleic acid or maleic anhydride.

The dicarboxylic acid is present in the polymer at from 5 to 50 mole percent, preferably 15 to 40 mole percent, and most preferably 25 to 30 mole percent. Preferably the dicarboxylic acid is at least partially neutralized, to between 10 and 95 mole percent, to increase the reactivity of the dicarboxylic acid during the polymerization process. The dicarboxylic acid may be neutralized with any known base. Preferred bases include sodium hydroxide, potassium hydroxide, and ammonium hydroxide.

The mono-carboxylic acid monomer of the invention consists of one or more ethylenically unsaturated monomers having single carboxylic acid functionality and includes aliphatic, branched or cyclic, mono-carboxylic acids, and the alkali or alkaline earth metal or ammonium salts thereof. Examples of mono-carboxylic acid monomers includes acrylic acid, methacrylic acid, ethacrylic acid, alpha-chloro-acrylic acid, alpha-cyano acrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), and mixtures thereof. Preferred mono-carboxylic acids are acrylic acid, methacrylic acid, ethacrylic acid and mixtures thereof. The mono-carboxylic acid(s) is present in the multifunctional polymer at from 20 to 94 mole percent.

The non-ionic monomer of the present invention is an ethylenically unsaturated nonionic monomer intended to include monomers represented by the chemical structure— wherein $n_1$ and $n_2$ are independently 0 to 10; $R^1$, $R^2$, $R^8$ and $R^9$ are independently hydrogen, $C_1$-$C_6$ alkyl, or $C_1$-$C_6$ alkyl-substituted aryl; $R^7$ is hydrogen, or $C_1$-$C_6$ alkyl; $X^1$ and $X^2$ are absent or are independently O, C=O, or hydrogen; $R^3$ is absent or is C=$OR^4$, $OR^4$, $NR^5R^6$, $C_1$-$C_{18}$ alkyl or hydrogen, where $R^4$ is $C_1$-$C_{18}$ alkyl or hydrogen and $R^5$ and $R^6$ are independently hydrogen, $C_1$-$C_6$ alkyl, or an alkyloxyether or alcohol; and $R^{10}$ is absent or is C=$OR^{11}$, $OR^{11}$, $NR^{12}R^{13}$, $C_1$-$C_{18}$ alkyl, or hydrogen, where $R^{11}$ is $C_1$-$C_{18}$ alkyl or hydrogen, $R^{12}$ and $R^{13}$ are independently hydrogen, $C_1$ to $C_6$ alkyl, or an alkyloxyether or alcohol.

The nonionic monomer is preferably selected from the group consisting of $C_1$-$C_6$ alkyl esters of (meth)acrylic acid and the alkali or alkaline earth metal or ammonium salts thereof, acrylamide and the $C_1$-$C_6$ alkyl-substituted acrylamides, the N-alkyl-substituted acrylamides and the N-alkanol-substituted acrylamides. Also useful are the $C_1$-$C_6$ alkyl esters and $C_1$-$C_6$ alkyl half-esters of unsaturated vinylic acids, such as maleic acid and itaconic acid, and $C_1$-$C_6$ alkyl esters of saturated aliphatic monocarboxylic acids, such as acetic acid, propionic acid and valeric acid. Preferred nonionic monomers are selected from the group consisting of methyl (meth)acrylate, mono- and dimethyl maleate, mono- and di-ethyl itaconate, and (meth)allyl acetates, propionates and valerates. Particularly preferred is methyl methacrylate. The water soluble polymers of the present invention contain from 0.1 to 10 mole percent of the nonionic monomer, preferably from 1 to 8 mole percent, and more preferably 1 to 5 mole percent. Minor amounts of crosslinking monomers such as diallyl maleate, alkylene bisacrylamide and triallyl cyanurate may also be employed herein.

The sulfonated or sulfated monomer consists of one or more ethylenically unsaturated monomers containing sulfonate functionality. The sulfonated or sulfated monomers include, but are not limited to (meth)acrylamido methyl propane sulfonic acid, styrene sulfonic acid, acrylamido alkyl or aryl sulfonic acid, allyl sulfonic acid, methallyl sulfonic acid, and salts thereof. Preferably the sulfonated monomer is (meth)acrylamido methyl propane sulfonic acid (AMPS) sodium salt. The sulfonated or sulfated monomer(s) is present in the multifunctional polymer at from 1 to 20 mole percent, preferably 5 to 15 mole percent, and most preferably 5 to 10 mole percent.

A preferred embodiment of the invention is a terpolymer of maleic acid/acrylic acid/methyl methacrylate/styrene/sulfonated monomer at 25-30/48-63/3-6/3-6/6-10 mole percent.

The monomers are polymerized by any conventional means known in the art, including emulsion, inverse emulsion, suspension, precipitation, and solution polymerization. Preferably the polymerization is a free radical solution polymerization. The reaction can take place in a batch, semi-batch or continuous process. Preferably the polymerization is performed at a low temperature of from 65 to 85° C. to take advantage of relative reactivity rates. Generally the dicarboxylic acid is fully charged to reactor first, and partially neutralized to improve reactivity. The other monomers and initiator are fed in a delayed manner. The polymerization generally takes from 3 to 5 hours. The solvent polymerization can advantageously be preformed using only water as the solvent, or in a mixed solvent system such as isopropanol/water.

Initiators useful in the polymerization are water-soluble initiators capable of liberating free radicals under the reaction conditions employed. Suitable initiators include peroxides such as benzoyl peroxide, azo compounds such as azobisisobutyronitrile, and salts of peracids (e.g., sodium or potassium persulfate). Redox systems employing, for example, t-butyl hydroperoxide may also be employed. Preferred initiators are persulfates, peroxides, or mixtures thereof. Transition metals are used with the peroxides to create a redox system. The multi-functional polymer of the invention is generally a random polymer, though the temperature of polymerization determines how blocky the polymer will be. The polymer may also be a star polymer, or other known architectures. The weight average molecular weight of the multi-functional polymer is preferably from 1,000 to 10,000, more preferably from 2500 to 6000, and most preferably from 3500 to 4000. The percent solids are typically in the range of 35-55 percent. The multifunctional polymer is typically post-polymerization neutralized to a pH of 4 to 5.

The polymers may be added neat to the aqueous systems or may be formulated into various water treatment compositions which may then be added to the aqueous systems. Once prepared, the water soluble multifunctional polymers are preferably incorporated into a water treatment composition comprising the water soluble polymer and other water treatment chemicals. Such other chemicals include corrosion inhibitors such as orthophosphates, zinc compounds and tolyltriazole. One advantage of the multifunctional polymer is that it can provide stabilization without phosphonobutane tricarboxylic acid (PBTC) or other phosphonate, though PBTC in combination with the multi-functional polymer works even better for threshold inhibition. The treatment level desired for the particular aqueous system to be treated will determine the level of the inventive polymer utilized in the water treatment compositions. In certain aqueous systems where large volumes of water are continuously treated to maintain low levels of deposited matter, the polymers may be used at levels as low as 0.5 mg/L. The upper limit on the level of polymer used will be dependent upon the particular aqueous system to be treated. For example, when used to disperse particulate matter the polymer may be used at levels ranging from 0.5 to 2,000 mg/L. When used to inhibit the formation or deposition of mineral scale the polymer may be used at levels ranging from 0.5 to 100 mg/L, preferably from 3 to 20 mg/L, more preferably from 5 to 10 mg/L.

The multifunctional polymer may be used in any aqueous system in which stabilization of mineral salts is important, such as in heat transfer devices, boilers, secondary oil recovery wells, automatic dishwashers, and substrates that are washed with hard water. The multifunctional polymer is especially effective under stressed conditions at which other scale inhibitors fail, such as at an LSI of up to 2.5 and even greater than LSI of 3.

In addition to being a scale inhibitor for calcium carbonate and calcium phosphate scale, the multi-functional polymer of the invention can also inhibit other scale including calcium sulfate, calcium oxalate, calcium fluoride, barium sulfate, and strontium sulfate. Additionally, the multifunctional polymer can inhibit silica scales, such as magnesium silicate, serpentine, and poly-silicic acid scales.

The multifunctional polymer will stabilize many minerals found in water, including, but not limited to, iron, zinc, phosphonate, and manganese. The polymer also disperses particulate found in aqueous systems.

The multifunctional polymer of the invention may be used to inhibit scales, stabilize minerals and disperse particulates in many types of processes. Examples of such processes include, but are not limited to sugar mill anti-scalant; soil conditioning; treatment of water for use in industrial processes such as mining, oilfields, pulp and paper production, and other similar processes; waste water treatment; ground water remediation; water purification by processes such as reverse osmosis and desalination; air-washer systems; corrosion inhibition; boiler water treatment; as a biodispersant; and in chemical cleaning of scale and corrosion deposits. One of skill in the art can conceive of many other similar applications for which the multifunctional polymer could be useful.

This invention will be further clarified by use of the following examples which are not intended to restrict the scope of the invention.

EXAMPLE 1

Process for the Synthesis of the Multifunctional Polymer, Aqueous Process:

To an initial charge consisting of maleic anhydride (34.3 grams), DI water (150 grams), add sodium hydroxide (22 grams), to partially neutralize the maleic acid charge. The temperature is raised to 80-85° C. reaction temperature.

To this initial reactor charge ferrous ammonium sulfate, hexahydrate, is added at 20 ppm as $Fe^{2+}$ based on total monomer charge.

The co-monomers are slow-added over a period of 3 to 5 hours. Acrylic acid and methyl methacrylate are blended together to constitute one feed (65 grams AA and 6.3 grams MMA). AMPS solution (44.7 grams as a 50% solution) is added as a separate feed stream. The initiator system consists of sodium persulfate and hydrogen peroxide at 5 wt % each, based on monomer (7 grams and 15.8 grams, respectively). Both initiators are mixed together and diluted with water. Initiator is fed for 10-20 minutes longer than the monomer.

After the slow addition is completed, the polymer is post-treated with erythrobic acid, diluted in DI water, at 0.3 to 0.5% based on monomer weight. A one hour post-cook helps reduce the residual monomer concentration. Additional sodium hydroxide is added to adjust the pH in the specified range.

EXAMPLE 2

Process for the Synthesis of the Multifunctional Polymer, IPA Process

This process utilizes an initial charge that consists of isopropanol and DI water. Isopropanol is added at 30-50 wt % (for the above formula 40 grams are added), based on monomer. Maleic anhydride is added to the initial charge and is partially neutralized with sodium hydroxide.

The co-monomers are slow-added over a period of 3 to 5 hours. Acrylic acid and methyl methacrylate are blended together to constitute one feed (64 grams AA and 6.3 grams MMA). AMPS solution (44.5 grams as a 50% solution) is added as a separate feed stream.

The initiator system consists of sodium persulfate and hydrogen peroxide at 5 wt % each, based on monomer (7 grams and 15.8 grams, respectively). Both initiators are mixed together and diluted with water. Initiator is fed for 10-20 minutes longer than the monomer.

After the slow addition is completed, the polymer is post-treated with erythrobic acid, diluted in DI water, at 0.3 to 0.5% based on monomer weight.

After the post-treatment step is completed, the isopropanol/water is removed via distillation until the residual isopropanol has reached<2000 ppm.

EXAMPLE 3

A polymer is formed as in Example 2 having the monomer ratio maleic acid:acrylic acid: methyl methacrylate:styrene: sulfonated monomer at 30:52:5:5:8 mole percent. The maleic anhydride is charged to the reaction vessel, diluted with water, and partially neutralized with sodium hydroxide to sodium maleate. The initial charge is heated to 85° C., and then isopropanol and ferrous ion are added. A monomer mix, consisting of acrylic acid, methyl methacrylate and styrene, the sulfonated monomer in a separate stream, and the initiator are slow-added over a period of 4 hours. The initiator is added for an additional 10 minutes, to scavenge unreacted monomer.

After distillation, to remove IPA azeotrope, additional post-neutralization is carried out to pH 3.5-4.

EXAMPLE 4

A polymer was made as in Example 1 with the following monomer ratio: maleic acid/acrylic acid/MMA/AMPS at 10/75/5/10 mole percent (10.7/58.9/5.5/24.9 wt %).

COMPARATIVE EXAMPLE 1

A polymer was made as in Example 1 with the following monomer ratio: maleic acid/MMA/AMPS at 40/5/55 mole percent (23/3/74 wt %).

COMPARATIVE EXAMPLE 2

A polymerization was carried out as in Example 1 with the following monomer ratio maleic acid/sulfonated styrene at 60/40 mole percent. A precipitate formed and polymerization did not occur.

EXAMPLE 5

Static Performance Test

Multifunctional efficiency was measured in a static test to evaluate scale/deposit inhibition properties simultaneously for calcium carbonate, calcium phosphate and iron hydroxide under severe water conditions as follows:

| | |
|---|---|
| Calcium Hardness | 400-444 ppm as $CaCO_3$ |
| Magnesium Hardness | 197-218 ppm as $CaCO_3$ |
| Total Alkalinity | 579-643 ppm as $CaCO_3$ |
| Temperature | 50° C. |
| pH | 8.8-9.0 |
| LSI | 2.93-3.17 |
| $PO_4^{-3}$ | 5.0-5.55 ppm |
| $Fe^{++}$ | 1.0-1.11 ppm |

A temperature-controlled incubator shaker was used to test samples, each sample containing the above test water with 20 ppm polymer in an uncapped 125 ml Erlenmeyer flask. All samples were subjected to constant shaking (250 rpm) on the flask platform for 17 hours and then removed and allowed to cool for one hour before membrane filtration (0.2 micron) and calcium, iron, and phosphate analyses. Lithium ion (1.6 ppm) was built into the test water to provide a baseline concentration. All % Inhibition/Stabilization data were calculated based on measured concentrations compensated for water evaporation (~1.11 cycles).

EXAMPLE 6

Figure 1:
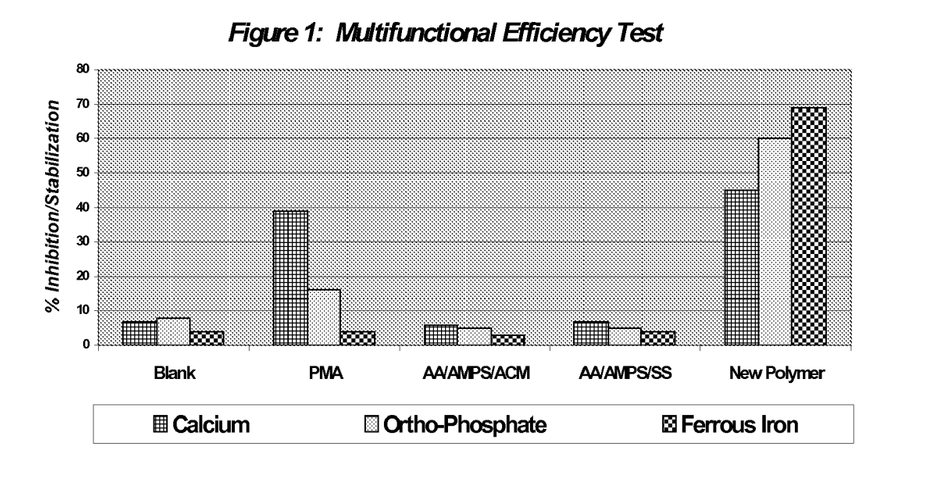
FIGS. 1, 3-7 and 9 are graphs showing comparative test results produced in the Examples.

The following polymers were tested in the static test of Example 5: the polymer of Example 1, BELCLENE 200 (polymaleic acid, PMA) from BioLab, ACUMER 3100 (acrylic acid (AA)/acrylamido methyl propane sulfonic acid (AMPS)/acrylamide (ACM)) from Rohm and Haas Company, GOODRITE K-798 (AA/AMPS/sulfonated styrene (SS) from Noveon, Inc.). The results are shown in FIG. 1. Under severely stressed conditions, the polymer of the invention showed superior efficiency in all three test criteria of calcium carbonate inhibition, calcium phosphate inhibition and iron stabilization, demonstrating the multifunctional properties of the polymer.

EXAMPLE 7

Dynamic Performance Test

Figure 2:
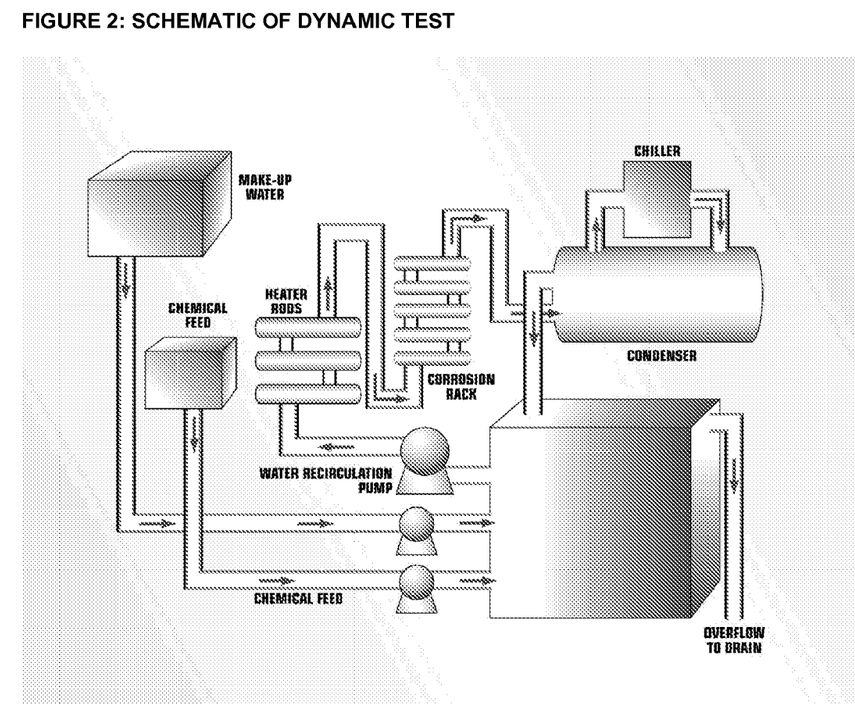
FIG. 2 is a schematic diagram of a dynamic test rig.

The dynamic performance tests were conducted on a non-evaporative dynamic test rig, as shown in the schematic drawing in FIG. 2. The system design allows increasing cycles of concentration by continuous addition of make-up water concentrate and controlled feeding of polymer with an overflow to maintain constant system volume and constant polymer concentration throughout the test. The water volume in the system is approximately 26 liters. The water is contained in a 25 liter basin and pumped through the system and then back into the basin. Upon leaving the basin, the water passes through a heat exchange rack, which includes three heat exchange rods running at approximately 750 watts surrounded by glass tubing for the water to flow through. The heated area of each rod is 11.75 in. This results in a heat transfer rate of approximately 16,000 BTU/hr/ft$^2$. The water then passes through a corrosion rack made of 1 inch CPVC piping, a condenser, and back into the basin. The basin water temperature is controlled through the use of a chiller, which passes cooled water through the condenser. The pH is also controlled through the use of a pH controller and a sulfuric acid feed. A flow meter is also mounted into the system for monitoring the flow rate of the water through the system. The cycles of concentration are controlled and increased through the constant feeding of hardness and an alkalinity concentrated solutions. A concentrated treatment feed is also constantly added, in order to maintain the desired dosage levels of treatment within the system.

The simulated make-up water at one cycle of concentration, for all beaker and dynamic testing, consisted of the following concentrations:

100.0 mg/L Ca as $CaCO_3$ (40.0 mg/L as Ca)

49.2 mg/L Mg as $CaCO_3$ (12.0 as Mg)

162 M Alkalinity (141.5 mg/L as $HCO_3$)

23 P Alkalinity (27.6 mg/L as $CO_3$)

Specific Conductivity=~750 micro-mhos

The heat transfer rate was maintained at a constant rate of approximately 16,000 BTU/hr/ft$^2$. The flow across the heat exchangers was also kept constant at 3.25 ft/sec.

Three variables in testing were: ferrous iron's presence or absence in the make-up water, operating pH, and bulk water temperature. However, the following ranges were the standard set points used for the largest majority of the testing, including all "standardized" testing for screening samples for scale adhesion properties.

Ferrous Iron=0.2-0.4 mg/L $Fe^{2+}$ (in the make-up water)

Temperature=103-105° F.

pH range=8.70-8.85

Figure 3:
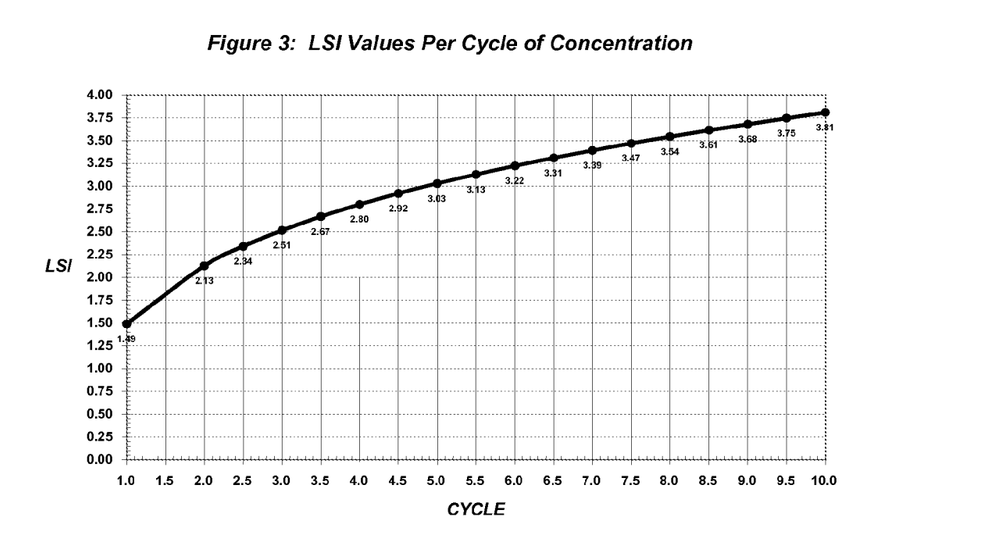

These particular conditions were able to reach 4.0 to 5.0 cycles of concentration, in three days, before calcium carbonate threshold inhibition failure occurred. There was no noticeable difference in the cycle obtained if ferrous iron was absent from the system. As expected, when the pH or temperature were increased, then the obtainable cycle was decreased and vise versa. FIG. 3 indicates the Langelier Saturation Index (LSI) factors of this water as the cycles of concentration were increased and pH and bulk water temperature were kept constant at 8.80 and 104° F. As one can see, the LSI values are approaching 3.0 as the cycles are approaching four. One will find that, while adjustments in pH and temperature will change the obtainable cycle of concentration, the obtainable LSI values always will remain approximately the same: between 2.8 and 3.2.

EXAMPLE 8

Figure 4:
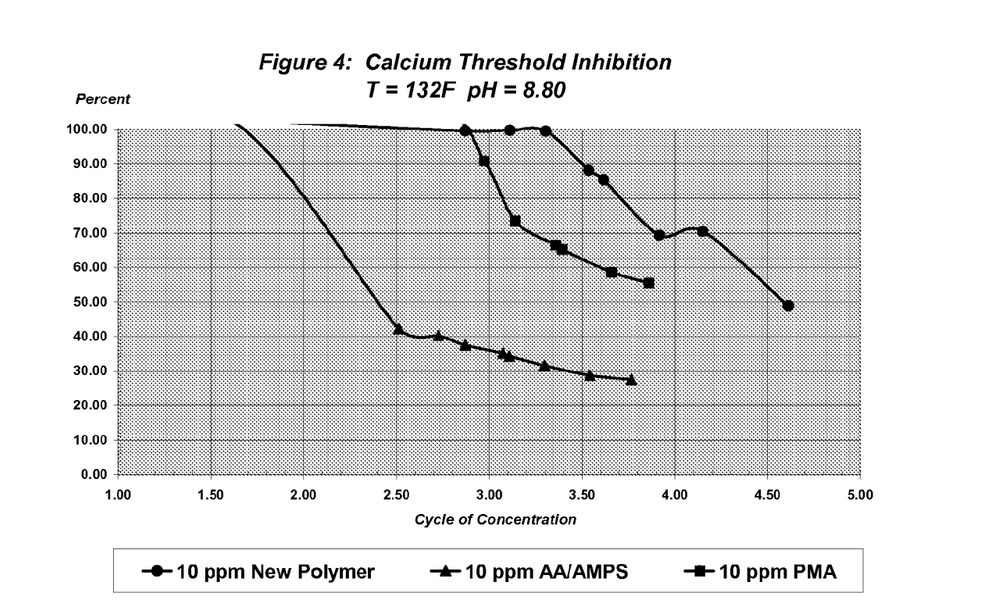

The dynamic test was performed using the method of Example 7 at 132° F. to stress the system and increase the scaling tendency. The results are shown in FIG. 4; "new polymer" is that of Example 1; the PMA is BELCLENE 200 from BioLab. The AA/AMPS is ACUMER 2000 from Rohm and Haas. One can see that the new polymer was able to keep more calcium in solution up to a higher cycle of concentration, before precipitation began to occur.

EXAMPLE 9

Figure 5:
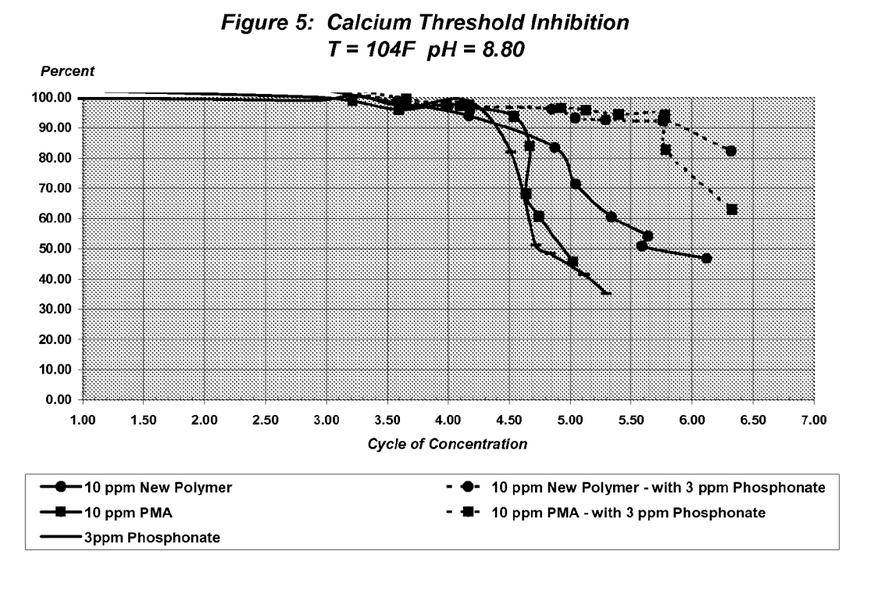

The dynamic test was performed using the method of Example 7 at 104° F. to demonstrate the performance of polymer-phosphonate combination treatments. The new polymer (Example 1) was compared to the BELCLENE 200 PMA homopolymer, with and without phosphonate. The results are shown in FIG. 5. The results show that LSI factors well above 3.0 can be achieved with the addition of phosphonate to the polymer treatment. This feat cannot be achieved with the sole use of phosphonate or polymer. The combination produces a synergetic effect for calcium carbonate inhibition. This effect is more pronounced with the new polymer than with the PMA.

EXAMPLE 10

Figure 6:
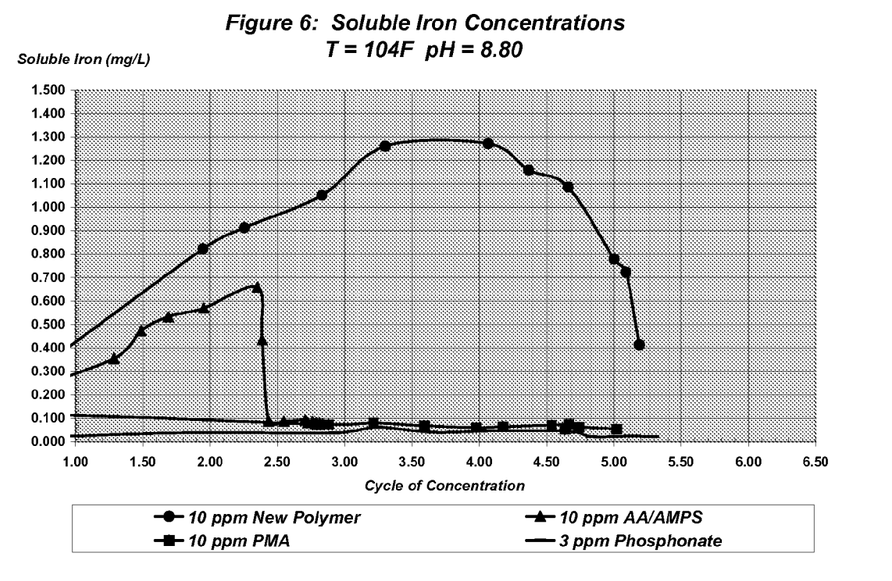

The dynamic test was performed using the method of Example 7 at 104° F. to demonstrate the ability of the new polymer to stabilize ferrous iron within the system. The multifunctional polymer of Example 1 ("new polymer") was compared to the BELCLENE 200 PMA homopolymer, the ACUMER 2000 AA/AMPS copolymer, and phosphonate. The results are shown in FIG. 6. One can see that the phosphonate and PMA were not able to stabile any ferrous iron throughout the test. The AA/AMPS copolymer was able to stabilize the ferrous iron up to around 2.4 cycles of concentration, where it failed due to the precipitation of calcium carbonate. The new polymer performed much better, maintaining the ferrous iron concentrations up to nearly 4.0 cycles of concentration.

EXAMPLE 11

Figure 7:
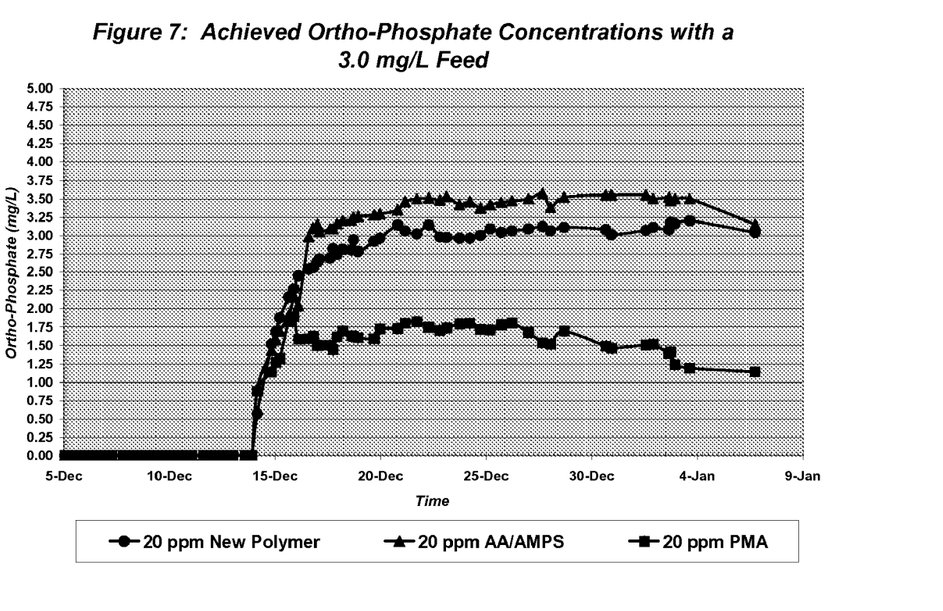

The dynamic test was performed using the method of Example 7 at 110° F. to demonstrate the ability of the new polymer to stabilize ortho-phosphate within the system. The polymer of Example 1 ("new polymer") was compared to the BELCLENE 200 PMA homopolymer and the ACUMER 2000 AA/AMPS copolymer. The results are shown in FIG. 7. All three systems had a 3.0 mg/L feed of ortho-phosphate introduced at the same time. Notice how the polymer of Example 1 and AA/AMPS treatments were able to achieve and maintain the intended 3.0 mg /L $PO_4$ in solution throughout the test, while the PMA was not. PMA was only able to achieve 1.75 mg/L of ortho-phosphate, which gradually dropped to 1.25 mg/L by the end of the test. The remaining ortho-phosphate was precipitating out as calcium phosphate. A large percentage of this precipitated calcium phosphate deposited as scale on the heat exchangers, which will be shown in the next example.

EXAMPLE 12

The dynamic test was performed using the method of Example 7 at 110° F. to demonstrate the ability of the new polymer to maintain the cleanliness of the rods. The polymer of Example 1 was compared to the BELCLENE 200 PMA homopolymer and the ACUMER 2000 AA/AMPS copolymer.

Figure 8:
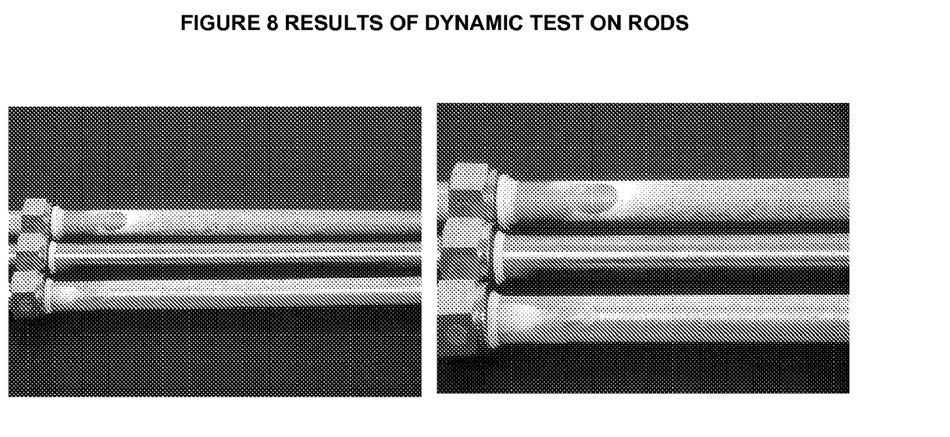
FIG. 8 shows dynamic test rods photographs.

After completion of the test described in the previous example, the bottom set of rods were removed from each system and allowed to dry. Photographs were then taken of the three rods, side by side, with one photograph a tighter zoom than the other (FIG. 8). Like with the coupons, the rods were only labeled with colored dots. The color of the dot denotes the treatment used: a blue dot (the rod in the center) indicates the polymer of Example 1, a red dot (the rod on the bottom) indicates PMA, and a green dot (the rod at the top of the picture) indicates AA/AMPS.

As one can see, there is a drastic difference between the cleanliness of the rod from the polymer of Example 1 treated system versus the rods from the other two treated systems. After photographing, each rod above was cleaned in a known volume of 2.5% nitric acid, until all the scale and deposits were dissolved. This solution was then analyzed for each suspected component. These components included: calcium, magnesium, lithium, ortho-phosphate, and iron. The analysis results were then converted from concentrations in mg/L to the actual weight of component deposited on the rod in milligrams. These converted results can be found in FIG. 9.

Figure 9:
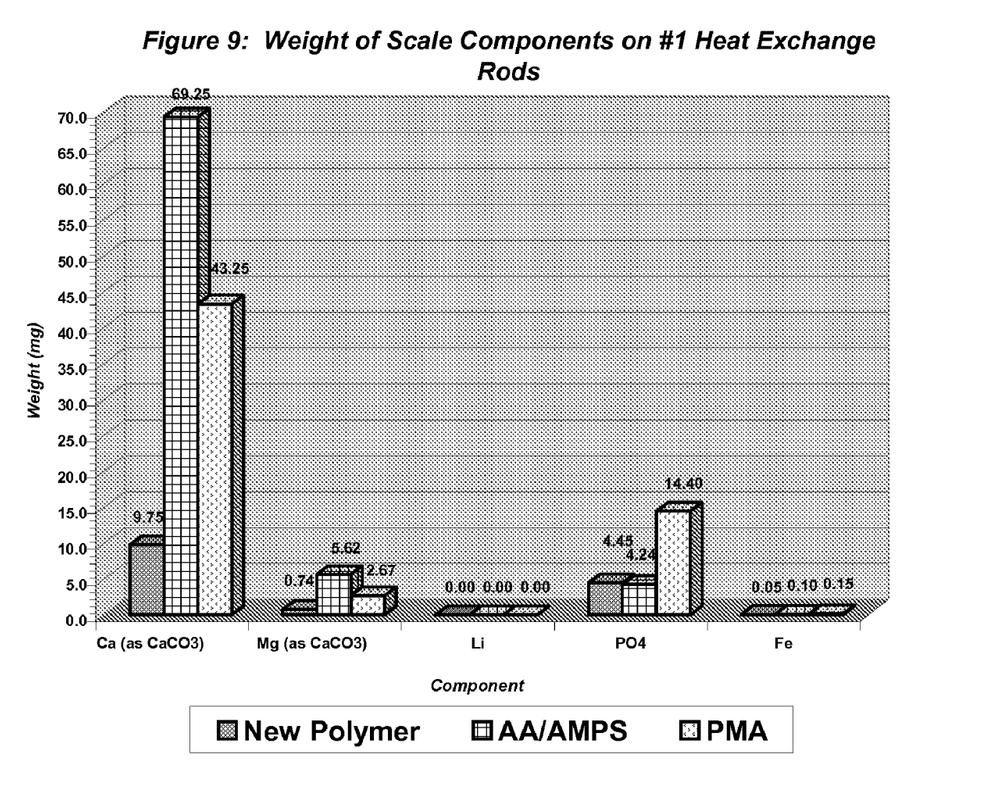

The difference in the amount of scale deposit build-up on the heat exchangers of the system treated with the polymer of Example 1 versus the PMA and AA/AMPS treated systems is remarkable, especially considering that this test ran for nearly five weeks. For calcium, magnesium, and iron, the amount of each component deposited on the rods or rod areas was significantly less than with the other treatments. Analysis results indicate that the vast majority of the scale found on the AA/AMPS heat exchangers was calcium carbonate, while the majority of scale found on the PMA heat exchangers was calcium phosphate.

Notice the relatively large spikes of ortho-phosphate with PMA, as compared to the polymer of Example 1 and AA/AMPS. In the previous example it was shown that the PMA was unable to stabilize all the added ortho-phosphate in solution. These spikes not only reiterate that fact, but they also indicate where a lot of the precipitated calcium phosphate in the PMA treated system is ending up.

Although the amount of iron found in the three scale analyses was small compared to the other components, there was a relative significance with the system treated with the polymer of Example 1. In all three cases, there was two to three times more iron found on the PMA and AA/AMPS heat exchangers than on the heat exchangers treated with the polymer of Example 1.

The most significant component analyzed for was calcium. The calcium total quantifies the amount of both calcium carbonate and calcium phosphate scale into one number. The amount of calcium found on the new polymer's heat exchange rod is practically nonexistent compared to the other two treatments. There is 11.5 times more calcium scale found on the PMA heat exchange rods than on the new polymer's heat exchange rods. Additionally, there was 18.2 times more calcium scale found on the AA/AMPS heat exchange rods than on the new polymer heat exchange rods. In other words, there was basically no calcium scale deposits found on the heat exchange rods of the new polymer. The previous photographs of the rods are the visual evidence to show this remarkable anti-deposition property.

EXAMPLES 13-62

The following polymers were synthesized according to the process in Example 1. They were evaluated based on the test described in Example 5. MA=maleic acid, IA=Itaconic Acid, AA=acrylic acid, MMA=methyl methacrylate, STY=styrene, SMS=sodium methallyl sulfonate, AMPS=acrylamido methyl propane sulfonic acid, PETMP=pentaerythritol tetrakismercaptoproprionate, COPS=sodium 1-allyloxy 2 hydroxy propyl sulfonate.

| | MONOMER | | | | | | | | | | % Ca Inhibition | % PO4 Inhibition | 1.6-1.8 mg/L Fe2 2.0-2.3 mg/L PO4 % Fe Stabilization |
|---|---|---|---|---|---|---|---|---|---|---|---|---|---|
| EXAMPLE | MA | IA | AA | MMA | Sty | SMS | AMPS | PETMP | SS | COPS | | | |
| 13 | 30.0 | 0.0 | 52.0 | 5.0 | 5.0 | 0.0 | 8.0 | 0.0 | 0.0 | 0.0 | 29 | 20 | 29 |
| 14 | 30.0 | 0.0 | 53.0 | 0.0 | 5.0 | 0.0 | 12.0 | 0.0 | 0.0 | 0.0 | 33 | 28 | 28 |
| 15 | 30.0 | 0.0 | 45.0 | 12.5 | 0.0 | 0.0 | 12.5 | 0.0 | 0.0 | 0.0 | 29 | 18 | 17 |
| 16 | 25.0 | 0.0 | 54.0 | 7.0 | 5.0 | 3.0 | 6.0 | 0.0 | 0.0 | 0.0 | 31 | 22 | 19 |
| 17 | 25.0 | 0.0 | 54.0 | 7.0 | 5.0 | 3.0 | 6.0 | 0.0 | 0.0 | 0.0 | 29 | 18 | 14 |
| 18 | 30.0 | 0.0 | 52.0 | 5.0 | 5.0 | 0.0 | 8.0 | 0.0 | 0.0 | 0.0 | 39 | 39 | 45 |
| 19 | 40.0 | 0.0 | 35.0 | 5.0 | 0.0 | 0.0 | 20.0 | 0.0 | 0.0 | 0.0 | 20 | 15 | 24 |
| 20 | 30.0 | 0.0 | 58.0 | 5.0 | 0.0 | 0.0 | 7.0 | 0.0 | 0.0 | 0.0 | 45 | 59 | 61 |
| 21 | 30.0 | 0.0 | 58.5 | 4.5 | 0.0 | 0.0 | 7.0 | 0.0 | 0.0 | 0.0 | 42 | 44 | 48 |
| 22 | 30.0 | 0.0 | 55.5 | 4.5 | 0.0 | 3.0 | 7.0 | 0.0 | 0.0 | 0.0 | 44 | 52 | 62 |
| 23 | 30.0 | 0.0 | 56.0 | 4.0 | 1.0 | 2.0 | 7.0 | 0.0 | 0.0 | 0.0 | 45 | 47 | 54 |
| 24 | 35.0 | 0.0 | 50.5 | 4.5 | 0.0 | 3.0 | 7.0 | 0.0 | 0.0 | 0.0 | 44 | 48 | 53 |
| 25 | 30.0 | 0.0 | 59.0 | 3.5 | 0.0 | 0.0 | 7.5 | 0.0 | 0.0 | 0.0 | 47 | 53 | 62 |
| 26 | 30.0 | 0.0 | 59.0 | 3.5 | 0.0 | 0.0 | 7.5 | 0.0 | 0.0 | 0.0 | 42 | 48 | 56 |
| 27 | 30.0 | 0.0 | 58.5 | 4.5 | 0.0 | 0.0 | 7.0 | 0.0 | 0.0 | 0.0 | 44 | 50 | 57 |
| 28 | 30.0 | 0.0 | 59.0 | 3.5 | 0.0 | 0.0 | 7.0 | 0.0 | 0.0 | 0.0 | 40 | 52 | 63 |
| 29 (comp) | 30.0 | 0.0 | 60.5 | 0.0 | 0.0 | 0.0 | 8.0 | 1.5 | 0.0 | 0.0 | 41 | 30 | 36 |
| 30 | 30.0 | 0.0 | 58.0 | 4.0 | 0.0 | 0.0 | 0.0 | 0.0 | 8.0 | 0.0 | 40 | 51 | 53 |
| 31 | 30.0 | 0.0 | 59.5 | 3.5 | 0.0 | 0.0 | 7.0 | 0.0 | 0.0 | 0.0 | 40 | 41 | 36 |
| 32 | 30.0 | 0.0 | 59.5 | 3.5 | 0.0 | 0.0 | 7.0 | 0.0 | 0.0 | 0.0 | 39 | 53 | 55 |
| 33 | 30.0 | 0.0 | 59.5 | 3.5 | 0.0 | 0.0 | 7.0 | 0.0 | 0.0 | 0.0 | 41 | 58 | 55 |
| 34 | 25.0 | 0.0 | 54.0 | 12.0 | 0.0 | 3.0 | 6.0 | 0.0 | 0.0 | 0.0 | 35 | 25 | 29 |
| 35 | 25.0 | 0.0 | 54.0 | 8.0 | 0.0 | 3.0 | 10.0 | 0.0 | 0.0 | 0.0 | 28 | 17 | 22 |
| 36 | 25.0 | 0.0 | 55.0 | 8.0 | 3.0 | 3.0 | 6.0 | 0.0 | 0.0 | 0.0 | 34 | 26 | 26 |
| 37 | 30.0 | 0.0 | 58.0 | 5.0 | 0.0 | 0.0 | 7.0 | 0.0 | 0.0 | 0.0 | 40 | 39 | 50 |
| 38 | 25.0 | 0.0 | 58.0 | 8.0 | 0.0 | 3.0 | 6.0 | 0.0 | 0.0 | 0.0 | 48 | 30 | 20 |
| 39 | 30.0 | 0.0 | 58.0 | 5.0 | 0.0 | 0.0 | 7.0 | 0.0 | 0.0 | 0.0 | 45 | 60 | 69 |
| 40 | 0.0 | 25.0 | 58.0 | 8.0 | 0.0 | 3.0 | 6.0 | 0.0 | 0.0 | 0.0 | 39 | 27 | 33 |
| 41 | 25.0 | 0.0 | 58.0 | 8.0 | 0.0 | 3.0 | 0.0 | 0.0 | 0.0 | 6.0 | 44 | 41 | 46 |

-continued

| | MONOMER | | | | | | | | | | 1.6-1.8 mg/L Fe2 2.0-2.3 mg/L PO4 | | |
|---|---|---|---|---|---|---|---|---|---|---|---|---|---|
| EXAMPLE | MA | IA | AA | MMA | Sty | SMS | AMPS | PETMP | SS | COPS | % Ca Inhibition | % PO4 Inhibition | % Fe Stabilization |
| 42 | 30.0 | 0.0 | 58.0 | 5.0 | 0.0 | 0.0 | 7.0 | 0.0 | 0.0 | 0.0 | 49 | 59 | 66 |
| 43 | 30.0 | 0.0 | 58.0 | 5.0 | 0.0 | 0.0 | 7.0 | 0.0 | 0.0 | 0.0 | 46 | 58 | 63 |
| 44 | 30.0 | 0.0 | 58.0 | 5.0 | 0.0 | 0.0 | 7.0 | 0.0 | 0.0 | 0.0 | 42 | 53 | 60 |
| 45 | 25.0 | 0.0 | 58.0 | 8.0 | 0.0 | 3.0 | 6.0 | 0.0 | 0.0 | 0.0 | 42 | 45 | 53 |
| 46 | 30.0 | 0.0 | 58.0 | 5.0 | 0.0 | 0.0 | 7.0 | 0.0 | 0.0 | 0.0 | 42 | 57 | 63 |
| 47 | 30.0 | 0.0 | 55.0 | 5.0 | 0.0 | 3.0 | 7.0 | 0.0 | 0.0 | 0.0 | 54 | 49 | 59 |
| 48 | 35.0 | 0.0 | 52.0 | 4.5 | 0.5 | 0.0 | 8.0 | 0.0 | 0.0 | 0.0 | 45 | 48 | 54 |
| 49 | 30.0 | 0.0 | 58.5 | 4.5 | 0.0 | 0.0 | 7.0 | 0.0 | 0.0 | 0.0 | 48 | 53 | 60 |
| 50 | 25.0 | 0.0 | 66.5 | 2.5 | 0.0 | 0.0 | 6.0 | 0.0 | 0.0 | 0.0 | 45 | 54 | 61 |
| 51 | 20.7 | 0.0 | 66.5 | 5.5 | 0.0 | 0.0 | 7.3 | 0.0 | 0.0 | 0.0 | 42 | 41 | 59 |
| 52 | 35.0 | 0.0 | 54.5 | 4.5 | 0.0 | 0.0 | 6.0 | 0.0 | 0.0 | 0.0 | 37 | 42 | 43 |
| 53 | 35.0 | 0.0 | 56.6 | 2.5 | 0.0 | 0.0 | 6.0 | 0.0 | 0.0 | 0.0 | 35 | 31 | 23 |
| 54 | 25.0 | 0.0 | 62.5 | 4.5 | 0.0 | 0.0 | 8.0 | 0.0 | 0.0 | 0.0 | 35 | 32 | 38 |
| 55 | 25.0 | 0.0 | 64.5 | 4.5 | 0.0 | 0.0 | 6.0 | 0.0 | 0.0 | 0.0 | 44 | 59 | 63 |
| 56 | 35.0 | 0.0 | 54.5 | 2.5 | 0.0 | 0.0 | 8.0 | 0.0 | 0.0 | 0.0 | 40 | 46 | 49 |
| 57 | 35.0 | 0.0 | 52.5 | 4.5 | 0.0 | 0.0 | 8.0 | 0.0 | 0.0 | 0.0 | 38 | 45 | 50 |
| 58 | 25.0 | 0.0 | 64.5 | 2.5 | 0.0 | 0.0 | 8.0 | 0.0 | 0.0 | 0.0 | 44 | 48 | 54 |
| 59 | 25.0 | 0.0 | 66.5 | 2.5 | 0.0 | 0.0 | 6.0 | 0.0 | 0.0 | 0.0 | 43 | 55 | 59 |
| 60 | 25.0 | 0.0 | 66.5 | 2.5 | 0.0 | 0.0 | 6.0 | 0.0 | 0.0 | 0.0 | 44 | 57 | 59 |
| 61 | 10.0 | 0.0 | 75.0 | 5.0 | 0.0 | 0.0 | 10.0 | 0.0 | 0.0 | 0.0 | 42 | 31 | 38 |
| 62 (comp) | 40.0 | 0.0 | 0.0 | 5.0 | 0.0 | 0.0 | 55.0 | 0.0 | 0.0 | 0.0 | 15 | 6 | 21 |

What is claimed is:

1. A process for inhibiting calcium carbonate and calcium phosphate scale formation comprising adding to an aqueous system an effective amount of a polymer comprising a multifunctional polymer composition formed from a monomer mixture comprising:
   at least one dicarboxylic acid present in an amount of 15 to 40 mole percent, wherein the dicarboxylic acid monomer is 10 to 95 percent neutralized;
   at least one monocarboxylic acid present in an amount of 37 to 79 mole percent;
   at least one non-ionic monomer present in an amount of 1 to 8 mole percent,
   wherein the at least one non-ionic monomer is selected from the group consisting of $C_1$-$C_6$ alkyl esters of (meth)acrylic acid and the alkali or alkaline earth metal or ammonium salts thereof, acrylamide and the $C_1$-$C_6$ alkyl-substituted acrylamides, the N-alkyl substituted acrylamides, the N-alkanol-substituted acrylamides and combinations thereof; and
   at least one sulfonated or sulfated monomer present in an amount of 5 to 15 mole percent;
   wherein the polymer composition has a weight average molecular weight of from 2,500 to 6,000, and
   wherein the polymer composition inhibits calcium scale formation in an aqueous system having a Langelier Saturation Index greater than 2.0.

2. The process of claim 1 wherein said system has a Langelier Scaling Index of greater than 2.5.

3. The process of claim 1 wherein the aqueous system further comprises phosphonobutane tricarboxylic acid.

4. The process of claim 1 wherein said aqueous system comprises 0.5 to 2000 mg/L of the multifunctional polymer.

5. The process of claim 1 wherein other scales are inhibited selected from the group consisting of calcium sulfate, calcium oxalate, calcium fluoride, barium sulfate, strontium sulfate, silicates, silica and mixtures thereof.

6. The process of claim 1 wherein the multifunctional polymer further stabilizes one or more minerals selected from the group consisting of iron, zinc, phosphonate, manganese and mixtures thereof.

* * * * *